United States Patent Office 3,444,193
Patented May 13, 1969

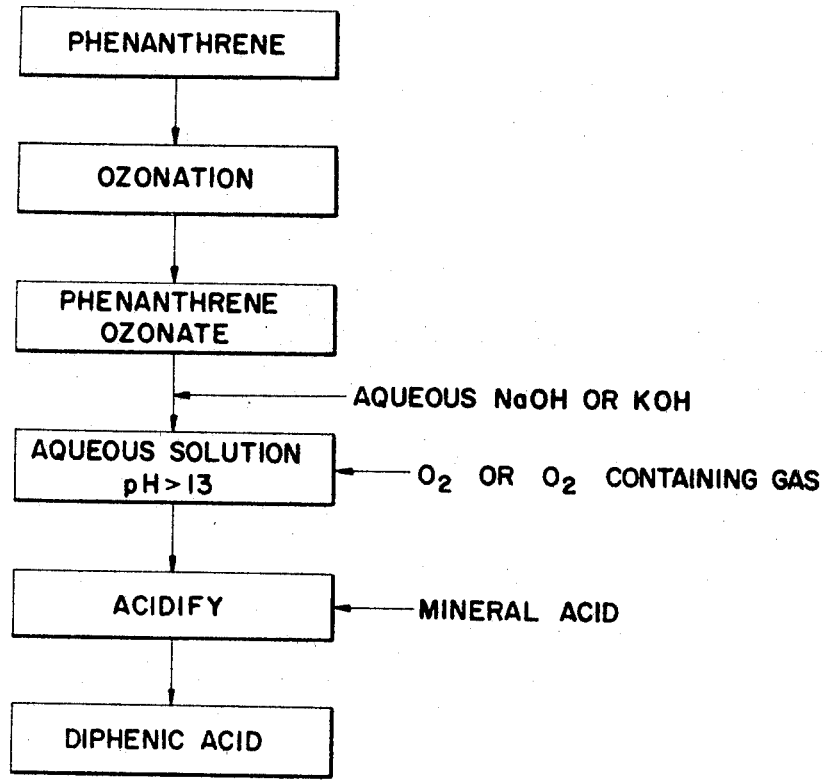

---

3,444,193
PROCESS FOR PREPARATION OF DIPHENIC ACID
Nicholas P. Greco, Pittsburgh, Pa., assignor to Koppers
Company, Inc., a corporation of Delaware
Filed Aug. 5, 1966, Ser. No. 570,601
Int. Cl. C07c *63/02, 63/14*
U.S. Cl. 260—523        7 Claims

---

ABSTRACT OF THE DISCLOSURE

A non-catalytic oxidation of the ozonation products of phenanthrene is carried out in the presence of oxygen under superatmospheric pressure and elevated temperatures in an alkaline solution whose pH is greater than 13. Diphenic acid, an intermediate in the preparation of plasticizers and resins, is produced in high purity and yields.

---

This invention relates to a method of making diphenic acid and specifically, to a method of preparing diphenic acid from ozonation products of phenanthrene.

O'Conner et al. [Ind. Eng. Chem. 49 1701 (1957)] and Calligan, U.S. Patent 3,007,963 used oxygen containing ozone for oxidizing a phenanthrene ozonate conversion product to diphenic acid, but the yields and purity of such diphenic acid were relatively poor. In contrast to those processes which require ozone as an oxidizing agent, my copending application, Ser. No. 268,468 now Patent No. 3,291,825, filed March 27, 1963, disclosed a process for making diphenic acid from the ozonation product of phenanthrene by the use of a Group VIII metal oxide catalyst and an alkali metal hypohalite (as the oxidizing agent).

It has now been found that surprisingly when ozonation products of phenanthrene are subjected to oxidation in a strongly alkaline solution with oxygen alone and without a catalyst that essentially quantitative yields of high purity diphenic acid are obtained.

In accordance with this process, the ozonation products of phenanthrene are heated in a strongly alkaline aqueous solution, the pH of the solution being greater than 13, in the presence of oxygen (either pure or diluted) until oxygen is no longer absorbed by the reaction mixture, and the oxidation mixture subsequently cooled and acidified, the high purity diphenic acid precipitates from the solution.

The manner in which the ozonation products of phenanthrene are obtained is not particularly critical to the process of this invention. Conveniently, the ozonation product of phenanthrene that is employed as a starting material in this invention is prepared from phenanthrene according to Sturrock et al. U.S. Patent 3,091,620. In such preparation, phenanthrene is suspended in a mixture of water with an organic solubilizing agent, and subjected to ozone. The resulting ozonation product can be neutralized and subsequently acidified to yield the stable diphenide which may at any subsequent time be treated with aqueous caustic for use in the process of the invention or the ozonation product may be basified to a pH value greater than 13, the organic layer removed, and the basic aqueous layer used directly.

Some of the various phenanthrene ozonation products which are useable in this process are illustrated by the following:

2,2'-biphenyl-dicarboxaldehyde (diphenaldehyde)

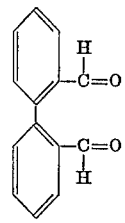

2-formyl-2'-biphenylcarbinol

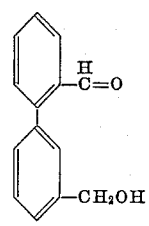

2-formyl-2'-biphenylcarboxylic acid

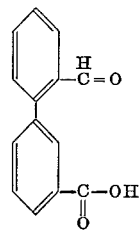

and lower alkyl esters thereof; 2,2'-biphenyl-dicarbinol

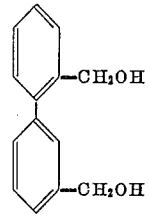

2'-hydroxymethyl-2-biphenylcarboxylic acid

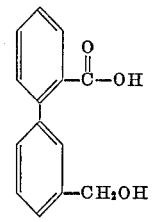

and lower alkyl esters thereof; and also the lactone (diphenide)

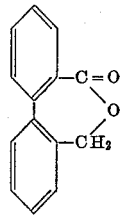

These materials are formed by various known phenanthrene ozonation processes.

The ozonation products of phenanthrene, according to the process of this invention are oxidized in an aqueous medium, the aqueous medium having a pH of at least 13. It is critical that the pH of the aqueous solution be at least 13, preferably between 13 and 14. This alkalinity can be reached, for example, by the use of either sodium or potassium hydroxide, usually in an amount of at least 2 moles of the hydroxide per mole of ozonate.

A novel feature of this invention resides in the fact that no catalyst is used during the oxidation step. Thus, there is no catalytic component to contaminate the high purity diphenic acid which is produced.

The reaction temperature used should be about 150 to 350° C. The use of lower temperatures results in a slower reaction rate while higher temperatures would tend to degrade the high purity diphenic acid which is produced.

The oxidant employed in this invention is ordinary oxygen. The oxygen may be diluted. The diluted oxygen may be air, which enables the production of diphenic acid at very low cost. The process should be carried out under a pressure of 150 to 500 lbs. per square inch of oxygen gas. The preferred range of pressure useable in my process is about 250 to 450 lbs. per square inch of oxygen. The oxygen will be consumed in oxidizing the phenanthrene ozonate and when the process is carried out in a closed vessel, the oxygen that is consumed should be replenished so as to keep the pressure within the desired range.

When no more oxygen is consumed by the reaction mixture, under the reaction conditions, the reaction has been completed. The cessation of oxygen consumption is the factor that readily establishes the time of completion of the reaction.

Upon completion of the reaction, the oxidation mixture need merely be cooled and acidified to precipitate the high yield of white diphenic acid. This diphenic acid may be then washed with water, and dried to give a high purity diphenic acid melting at about 233° C.

The foregoing has described a novel process for the production of diphenic acid from the ozonation product of phenanthrene. In accordance with this invention, high yields of high purity diphenic acid are obtained. Since the process does not use a catalyst, the product is not contaminated with catalysts, and no expensive or unusual measures are required to obtain the high purity product. Furthermore, since oxygen alone is used, the oxygen may be a commercial grade oxygen or for that matter may even be the oxygen from the air. A further feature of the invention is that the production of the diphenic acid from the ozonation product is carried out in an aqueous solution without the use of any flammable solvents. Thus, the novel process does not involve explosive hazards. The high purity of the diphenic acid produced by this process and particularly the absence of any trace catalytic components makes the diphenic acid particularly suitable as intermediates in the preparation of plasticizers, resins and the like.

My invention is further illustrated by the following examples wherein, unless otherwise indicated, parts are parts by weight.

EXAMPLE I

Fifteen parts of phenanthrene were suspended in a mixture of 50 parts tertiary butyl alcohol and 50 parts of water, followed by the passage of ozonized air into the suspension at room temperature until the theoretical amount ozone had been absorbed.

Upon completion of the reaction, aqueous sodium hydroxide was added to neutralize the reaction mixture to a pH of 7.5. The organic solvent was then removed by distillation. Aqueous sulfuric acid was then added to acidify the solution and the product, diphenide, precipitated from the solution.

EXAMPLE II

An aliquote of the ozonation product (200 g. 0.95 mole of diphenide) (Sxample I) was heated in 0.5 liter of water with sodium hydroxide (158 g., 3.94 moles) until the product dissolved. The clear water white solution was diluted with 0.5 liter of water and placed in an autoclave lined with Inconel to resist corrosion. The autoclave was pressured with oxygen gas to 170 p.s.i. and heated with stirring to 200–250° C., at which temperature the pressure had increased to 350 p.s.i. Under those conditions, oxygen was being consumed and was replenished as often as necessary to keep the pressure at 350 p.s.i. After 3.5 hours, oxygen was no longer being consumed. The oxidation mixture was cooled to about room temperature and acidified with sulfuric acid (200 g. 2.0 moles). The diphenic acid precipitated as a white solid. The diphenic acid was washed with water until the wash water was free of sodium sulfate when tested. The melting point of the diphenic acid (225 grams., 97% yield) was 233° C. corresponding excellently to the literature value of 234° C.

EXAMPLE III

The process of Example II was repeated except that air was substituted for pure oxxygen. A pressure of 1500 lbs. was used during the oxidation. Spent air was systematically removed from the reactor and the oxygen pressure maintained at the desired range. The yield of diphenic acid was 96%.

EXAMPLE IV

The process of Example II was repeated except that the pH of the aqueous solution was 12.1. The reaction proceeded slowly and contamination of the product with undesirable by-products resulted. Only a 55% yield of the diphenic acid was obtained.

EXAMPLE V

Other phenanthrene ozonation products as tabulated below were employed as starting materials for the oxidation with excellent yields of high purity diphenic acid. The oxidations were carried out generally according to Example II.

| Ozonation product: | Diphenic acid yield, present |
|---|---|
| 2,2-biphenylcarboxaldehyde | 98 |
| 2-carbomethoxy-2'-biphenylcarboxylic acid | 94 |
| 2-carbethoxy-2'-biphenyl carbinol | 96 |

I claim:
1. A process for the production of diphenic acid from the ozonation product of phenanthrene which comprises passing oxygen through an aqueous solution of said ozonation product at a pH of at least 13 and a temperature of 150 to 350° C. at superatmospheric pressure until no more oxygen is consumed by the reaction of said ozonation product and said oxygen.

2. The process of claim 1 wherein the ozonation product of phenanthrene is obtained by suspending phenanthrene in a mixture of equal parts by weight of tertiary-butyl alcohol and washer and passing ozonized air into the suspension at room temperature until the theoretical amount of ozone has been absorbed.

3. Process for the production of diphenic acid from the ozonation product of phenanthrene comprising:
  (a) dissolving said ozonation product in an aqueous alkali metal hydroxide solution so that the reaction solution has a pH of at least 13,
  (b) bringing said aqueous solution to a temperature of 150–350° C. and under a superatmospheric pressure of 250–450 pounds per square inch,
  (c) subjecting said solution to oxygen until oxygen is no longer consumed by said solution,
  (d) acidifying said solution to precipitate the diphenic acid, and
  (e) separating said diphenic acid from said solution.

4. The process of claim 3 wherein the alkali metal hydroxide of said solution is sodium hydroxide.

5. The process of claim 3 wherein said alkali metal hydroxide of said solution is potassium hydroxide.

6. The process of claim 3 wherein said temperature is 200–300° C.

7. The process of claim 1 wherein said oxygen is diluted as air.

References Cited
UNITED STATES PATENTS
2,888,485  5/1959  Bailey _____ 260—523

JAMES A. PATTEN, *Primary Examiner.*

JAMES NIELSEN, *Assistant Examiner.*